United States Patent [19]

Adachi

[11] 4,210,357

[45] Jul. 1, 1980

[54] VEHICLE HAVING SIDE-REAR SURVEILLANCE RADAR WITH ANTENNA REFLECTOR ASSEMBLED WITH REARVIEW MIRROR

[75] Inventor: Masahiro Adachi, Yokohama, Japan

[73] Assignee: Nissan Motor Company Limited, Yokohama, Japan

[21] Appl. No.: 942,791

[22] Filed: Sep. 15, 1978

[30] Foreign Application Priority Data

Sep. 16, 1977 [JP] Japan .................................. 52-110538

[51] Int. Cl.² ............................................. B62D 39/00
[52] U.S. Cl. .................................. 296/84 B; 343/713; 343/720
[58] Field of Search ............................ 296/84 B, 84 R; 350/277, 283, 307; 343/713, 720, 781, 840, 909

[56] References Cited

U.S. PATENT DOCUMENTS

| | | | |
|---|---|---|---|
| 3,120,640 | 2/1964 | Midlock | 325/16 |
| 3,165,749 | 1/1965 | Cushner | 343/909 |
| 3,188,641 | 6/1965 | Gergely | 343/720 |

*Primary Examiner*—Philip Goodman
*Attorney, Agent, or Firm*—Schwartz, Jeffery, Schwaab, Mack, Blumenthal & Koch

[57] ABSTRACT

A vehicle comprising a radar system for surveillance of a side and rear area and a rearview mirror unit mounted on the outside of the vehicle body. The antenna reflector of the radar has a light-transmissible structure and is received in the frame of the rearview mirror unit so as to be spaced rearwards from the mirror and to protrude sidewise from the outline of the vehicle body. This antenna arrangement is most appropriate to side-rear lookout and is favorable to the appearance of the vehicle.

11 Claims, 8 Drawing Figures

VEHICLE HAVING SIDE-REAR SURVEILLANCE RADAR WITH ANTENNA REFLECTOR ASSEMBLED WITH REARVIEW MIRROR

BACKGROUND OF THE INVENTION

This invention relates to a vehicle having a radar system for surveillance of a side-rear area, and more particularly to an antenna of the radar system.

Recently it has been proposed to provide a microwave radar system to a vehicle, particularly to an automobile, as a safety means for the surveillance of other vehicles possibly travelling sidewise behind within a certain range. A primary purpose of the provision of such a radar system is to preclude a collision of the vehicle with another vehicle when the vehicle changes its course or lane.

One of the essential components of a radar system is an antenna which serves for both transmission of a radar beam and reception of echo signals. In the case of a side-rear lookout radar system on a vehicle, the radar antenna should be located on the outside of the vehicle body and, to form a radar beam suitable for effective search of side and rear area, it is desirable that the antenna protrudes sidewise from the plan view outline of the vehicle body. In other words, it is preferable from the functional viewpoint that the radar antenna(or antennas) is mounted on a side panel of the vehicle body. However, the mounting of the radar antenna in such a manner requires the allotment of an exclusive mounting space to the antenna and, besides, is unfavorable to the appearance or style of the vehicle.

SUMMARY OF THE INVENTION

It is an object of the present invention to provice a side-rear lookout radar system on a vehicle, wherein a radar antenna is mounted on the vehicle body in such an arrangement and at such a location that a desirable radar beam can be formed without the need of providing an extra space for the mounting of the antenna and without impairing the appearance of the vehicle.

It is another object of the invention to provide a radar system for the described purpose, in which a radar antenna is assembled with an outside rear view mirror so as to be mounted on the vehicle body as a single unit.

According to the invention, a vehicle comprises a radar system for surveillance of a side and rear area and a rearview mirror unit including a mirror frame mounted on the outside of the vehicle body in a front and side portion thereof and a rearview mirror received in the frame. The radar system comprises a microwave transmitter unit, a feeder horn connected to the transmitter unit to radiate the generated microwave and an antenna reflector to reflect rearwards the microwave radiated from the feeder horn. As an essential feature of the invention, the reflector of the radar system has a light-transmissible structure and is received in the frame of the rearview mirror unit so as to be spaced rearwards from the mirror. The mirror frame and the reflector are arranged such that the reflector protrudces, at least partly, sidewise from the outline of the vehicle body.

The microwave transmitter unit and the feeder horn may be assembled with the rearview mirror unit but may alternatively be mounted on the vehicle body so as to be separated from the mirror frame. In the case of the vehicle being an automobile, the mirror frame would be mounted on a front fender.

The light-transmissible antenna reflector is given, for example, by coating one side of a transparent glass plate with a thin film of a metal such that the coated side becomes the outside of the reflector, or by embedding fine wires in a transparent glass or synthetic resin plate such that the wires are arranged parallel to each other at suitable intervals.

The installation of the radar antenna reflector in the rearview mirror frame results in that the antenna reflector is mounted on the vehicle body without the need of allotment of an exclusive mounting space to the reflector and that the location of the reflector is quite suitable for side-rear outlook by the radar.

DESCRIPTION OF THE PREFERRED EMBODIMENTS

Figure 1:
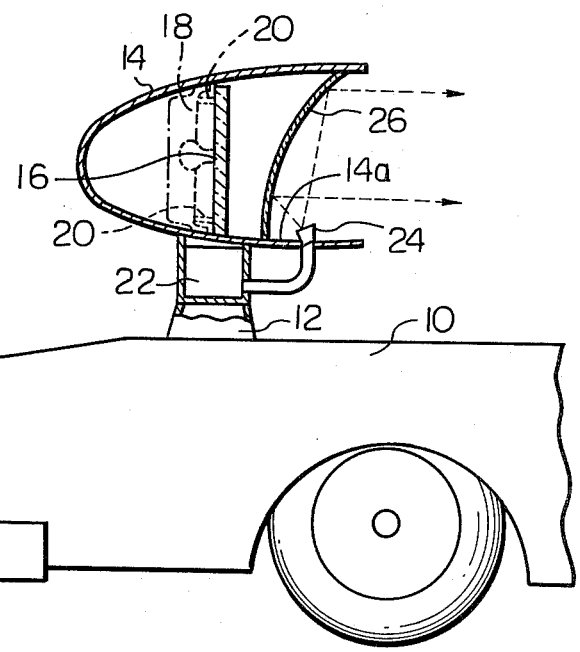
FIG. 1 is a sectional side elevation of a rear outlook mirror-antenna unit as an embodiment of the invention mounted on a vehicle body.

In FIG. 1, indicated at 10 is a front portion of a vehicle body such as a front fender of an automobile. A hollow post 12 set up on this portion 10 of the body supports a spindle-shaped mirror frame 14 with a rearview mirror 16 received therein. The mirror 16 may be held rotatable so as to change its orientation by remote control. For example, a reversible electric motor(not shown) may be mounted on a support plate 18, which is fixedly received in the mirror frame 14, to selectively pull wires 20 attached to the mirror 16, or alternatively use may be made of a flexible cable(not shown) to change the orientation of the mirror 16 from the driver's seat.

A conventional microwave transmitter unit 22 including an oscillator such as a Gunn diode and a microwave modulator is installed in the post 12, and a waveguide or transmission line (not indicated) extends from the transmitter 22 to a feeder horn 24. The mirror frame 14 is extended rearwards from the mirror 16 so as to give a tubular end portion 14a. Received fixedly in this portion 14a is a parabolic antenna reflector 26 spaced rearwards from the mirror 16 with the concave side faced to the rear. As will be illustrated later, the reflector 26 has such a structure as transmits light rays but efficiently reflects electromagnetic waves in the frequency range used for radars, for example microwaves between 10 GHz and 80 GHz. The feeder horn 24 intrudes into the rear end portion 14a of the mirror frame 14 such that the wave outlet of the feeder horn 24 is located at the focal point of the parabolic reflector 26, which is designed and arranged such that its focal point is close to a lowermost region of the periphery of the mirror frame 14 in order to avoid the feeder horn 24 coming in the field of vision of the mirror 16. Preferably the inside of the extended portion 14a of the mirror frame 14 is painted black so as not to reflect light to the antenna reflector 26 and the mirror 16.

Since antenna beam width in a rear lookout radar on a road vehicle is in the range from about 10 degrees to about 30 degrees, the size of the antenna reflector 26 becomes smaller than 10 cm in diameter. Accordingly there is no need of unusually enlarging the dimensions of the mirror frame 14 for the sake of installation of the antenna reflector 26. Thus, the invention has succeeded in mounting a side-rear outlook radar antenna on a vehicle body, particularly on an automobile body, without occupying an extra space and without impairing the appearance or style of the vehicle.

Figure 2:
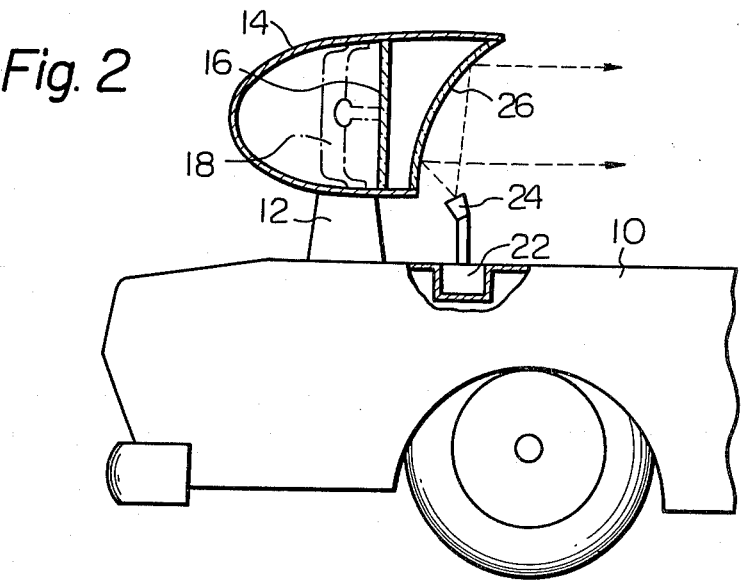
FIG. 2 shows a modification of the mirror-antenna unit of FIG. 1.

FIG. 2 shows another embodiment of the invention. The mirror frame 14 mounted on the front fender 10, the rearview mirror 16 and the light-transmissible antenna reflector 26 are fundamentally similar to those in FIG. 1. In the case of FIG. 2, the microwave transmitter unit 22 is attached directly to the body of the vehicle so as to be out of sight, and the feeder horn 24 too is supported by the vehicle body so as not to contact the mirror frame 14. By the employment of this arrangement, the addition of the function of a radar antenna to a rearview mirror unit can be accomplished with only minimized increase in the total weight of the unit (including the post 12). This is quite favorable for rendering the resultant mirror-antenna reflector unit resistant to shocks and vibrations.

Figure 3:
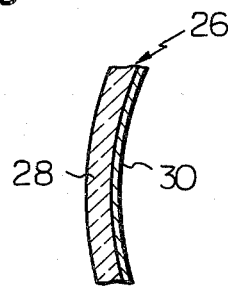
FIGS. 3 and 4 show two variations of a radar antenna reflector for use in a rear outlook mirror-antenna unit according to the invention.

Referring to FIG. 3, the light-transmissible antenna reflector 26 can be made by coating one side (concave side) of a suitably curved plate 28 of transparent glass with a thin, i.e. a few microns thick, film 30 of a metal or a transparent and conductive metal oxide such as tin oxide. The coating 28 may be made, for example, by vacuum evaporation.

Figure 4:
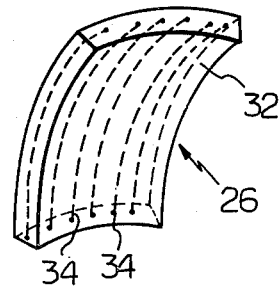

FIG. 4 shows another structure of the antenna reflector 26. In this case, fine metal wires 34 are embedded in a suitably curved plate 32 of transparent glass or a transparent synthetic resin. The wires 34 are arranged in parallel with each other at regular intervals less than one-half wavelength of the radar beam so as to extend normal to the direction of the electric field produced by the radar beam. As a further variation, use may be made of a wire screen for the production of the antenna reflector 26.

The radar antenna reflector 26 according to the invention is located in a front portion of the vehicle body and protrudes sidewise from the outline of the vehicle body. The appropriateness of such positioning of the antenna reflector 26 will be understood from comparative illustrations of radar beam patterns in FIGS. 5A-5D.

Figure 5A:
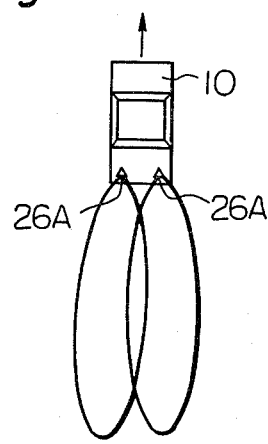
FIGS. 5A to 5D illustrate variations in the performance of a rear outlook radar system on an automobile depending on the location of radar antennas.
Figure 5B:
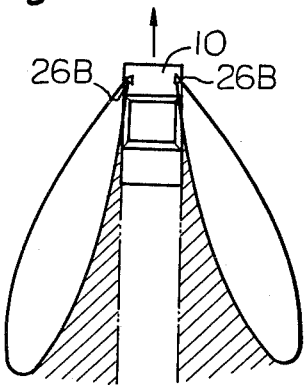
Figure 5C:
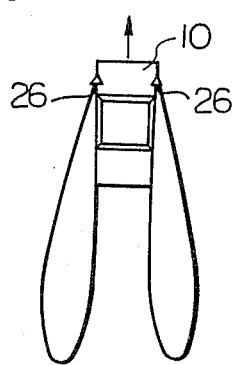
Figure 5D:
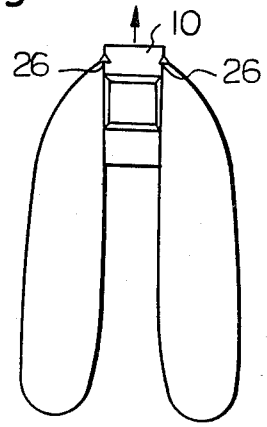

FIG. 5A shows the mounting of antenna reflectors 26A of a rear outlook radar on rear fenders of an automobile. In this case the radar is not sufficiently effective for surveillance of vehicles travelling behind the illustrated car but on the adjacent lanes. In FIG. 5B, radar antenna reflectors 26B are mounted on front fenders of the car but do not protrude sidewise from the car body. In this case the radar serves for side-rear lookout, but the radar beam from each antenna 26B leaves a blind zone (hatched area) widening in a side-rear direction. As a regrettable matter, the illustrated blind zones are almost out of the field of vision of rearview mirrors. FIG. 5C shows the arrangement of radar antenna reflectors 26 according to the invention. Since each of the antenna reflectors 26 in FIG. 5C is located in a front portion of the car and protrudes sidewise from the outline of the car body, the radar beam from each antenna 26 can be directed nearly parallel to the center axis of the car and, hence, leaves little blind zone alongside the car or in the side-rear of the car. In other words, the radar with the antenna reflectors 26 thus arranged can accomplish side-rear lookout to the extent necessary for the car to change its course or lane safely. The side lookout ability of the radar can be further enhanced, for example, as illustrated in FIG. 5D by utilizing an antenna reflector of wide radiation pattern such as a beam transformational antenna as the antenna (26) in the rearview mirror frame 14.

What is claimed is:

1. A vehicle comprising:
   a body;
   a rearview mirror unit including a mirror frame mounted on the outside of said body in a front and side portion thereof and a rearview mirror received in said mirror frame; and
   a radar system for surveillance of a side and rear area, said radar system comprising a microwave transmitter unit, a feeder horn connected to said transmitter unit to radiate microwave generated by said transmitter unit and an antenna reflector to reflect rearwards the microwave radiated from said feeder horn, said reflector having a light-transmissible structure and being received in said mirror frame so as to be spaced rearwards from said rearview mirror, said mirror frame and said reflector being arranged such that said reflector protrudes, at least partly, sidewise from the outline of said body.

2. A vehicle as claimed in claim 1, wherein said rearview mirror unit comprises a hollow post set up on said body to support said mirror frame thereon, said transmitter unit being disposed in said post, said feeder horn intruding into said mirror frame.

3. A vehicle as claimed in claim 1, wherein said transmitter unit is attached to said body separately from said rearview mirror unit, said feeder horn being supported by said body so as to be spaced from said mirror frame.

4. A vehicle as claimed in claim 1 or 2, wherein said reflector is a parabolic reflector, the wave outlet of said feeder horn being located substantially at the focal point of said parabolic reflector.

5. A vehicle as claimed in claim 1, wherein said reflector is a transparent glass plate the outside of which is coated with a thin film of a metal.

6. A vehicle as claimed in claim 1, wherein said reflector comprises a plate of a transparent and electrically nonconducting material and a plurality of wires embedded in said plate so as to be parallel to each other at regular intervals less than one-half wavelength of said microwave.

7. A vehicle as claimed in claim 6, wherein said wires extend normal to the direction of an electric field to be produced by a radar beam emerged from said reflector.

8. An automobile comprising:
   a body including a front fender;
   a rearview mirror unit including a mirror frame mounted on said front fender so as to protrude, at least partly, sidewise from the outboard side of said front fender and a rearview mirror received in said mirror frame; and
   a radar system for surveillance of a side and rear area, said radar system comprising a microwave transmitter unit, a feeder horn connected to said transmitter unit to radiate microwave generated by said transmitter unit and an antenna reflector to reflect rearwards the microwave radiated from said feeder horn, said reflector having a light-transmissible structure and being received in said mirror frame so as to protrude, at least partly, sidewise from the outboard side of said front fender.

9. An automobile as claimed in claim 8, wherein said rearview mirror unit comprises a hollow post set up on said front fender to support said mirror frame thereon, said mirror frame having a tubular portion extending rearwards from said rearview mirror to receive therein said reflector, said transmitter unit being disposed in said post, said feeder horn intruding into said mirror frame such that the wave outlet of said feeder horn is located close to a lowermost region of the periphery of said tubular portion.

10. An automobile as claimed in claim 8, wherein said transmitter unit is attached to said body so as to be spaced from said rearview mirror unit and covered by said front fender, said feeder horn protruding from said front fender so as to be spaced from said mirror frame.

11. An automobile as claimed in claim 9 or 10, wherein said reflectoe being a parabolic reflector, the wave outlet of said feeder horn being located substantially at the focal point of said parabolic reflector.

* * * * *